US009803984B2

(12) United States Patent
Luan et al.

(10) Patent No.: US 9,803,984 B2
(45) Date of Patent: Oct. 31, 2017

(54) NAVIGATION METHOD, DEVICE FOR NAVIGATION AND NAVIGATION SYSTEM

(71) Applicant: TENCENT TECHNOLOGY (SHENZHEN) COMPANY LIMITED, Shenzhen (CN)

(72) Inventors: Hao Luan, Shenzhen (CN); Yingfeng Zhang, Shenzhen (CN); Mu Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 14/306,695

(22) Filed: Jun. 17, 2014

(65) Prior Publication Data

US 2014/0297178 A1    Oct. 2, 2014

Related U.S. Application Data

(63) Continuation of application No. PCT/CN2014/070259, filed on Jan. 7, 2014.

(30) Foreign Application Priority Data

Jan. 24, 2013    (CN) .......................... 2013 1 0027273

(51) Int. Cl.
*G01C 21/20*    (2006.01)
*G01C 21/34*    (2006.01)
(Continued)

(52) U.S. Cl.
CPC ......... *G01C 21/20* (2013.01); *G01C 21/3438* (2013.01); *H04L 51/20* (2013.01); *H04L 67/00* (2013.01)

(58) Field of Classification Search
CPC ..... G01C 21/362; G01C 21/343; H04W 4/02; H04W 64/00; H04W 24/08; H04W 36/32;
(Continued)

(56) References Cited

U.S. PATENT DOCUMENTS 6,940,451 B2 *  9/2005  Kanerva ................ G01C 21/20
                                                    342/357.31
8,098,151 B2 *  1/2012  Hilliar Isaacson .... G01C 21/20
                                                    340/539.11
(Continued)

FOREIGN PATENT DOCUMENTS

CN        1975459 A       6/2007
CN      101039475 A       9/2007
(Continued)

OTHER PUBLICATIONS

International Search Report & Written Opinion issued in counterpart International Application No. PCT/CN2014/070259 dated Apr. 21, 2014.

(Continued)

*Primary Examiner* — Thomas G Black
*Assistant Examiner* — Demetra Smith-Stewart
(74) *Attorney, Agent, or Firm* — Fitzpatrick, Cella, Harper & Scinto

(57) ABSTRACT

The present disclosure relates to a navigation method, a device for navigation and a navigation system in the field of communication technique. Said method comprises steps of performing a location processing to obtain a location of the first terminal, acquiring a location of a second terminal; and navigating the second terminal based on navigation information from the location of the second terminal to a target location. The target location is a predetermined location or a current location of the first terminal. A first terminal for navigation comprises a location module, an acquiring module and a navigation module. A server for navigation comprises an acquiring module and a transmitting module. Said system comprises the first terminal and the server. The present disclosure accomplished a location-based navigation service and incorporated the location service and the navi- (Continued)

gation function so as to enhance the location service function and sufficiently meet with the user's requirements.

14 Claims, 10 Drawing Sheets

(51) Int. Cl.
*H04L 29/08* (2006.01)
*H04L 12/58* (2006.01)

(58) Field of Classification Search
CPC ........ H04W 88/02; H04W 8/16; H04L 67/18; H04L 51/18; H04L 67/22; G01S 5/0027; G01S 5/0009; G01S 19/42; G06F 2221/2111; G06Q 30/0266; G08G 1/20; G08G 1/123; G08G 1/096791; G08G 1/096816; G08G 1/0969; G05D 1/0027; G05D 1/027; G05D 1/0274; G05D 1/0278
See application file for complete search history.

(56) References Cited

U.S. PATENT DOCUMENTS

| | | | | |
|---|---|---|---|---|
| 8,369,867 | B2* | 2/2013 | Van Os | H04W 4/02 370/310.2 |
| 8,644,843 | B2* | 2/2014 | Canon | G01S 3/74 455/456.1 |
| 9,389,090 | B1* | 7/2016 | Levine | G01C 21/3438 |
| 2004/0054428 | A1* | 3/2004 | Sheha | G01C 21/20 700/56 |
| 2005/0288036 | A1* | 12/2005 | Brewer | H04W 8/18 455/456.2 |
| 2006/0223518 | A1* | 10/2006 | Haney | H04M 1/72519 455/420 |
| 2008/0208444 | A1* | 8/2008 | Ruckart | G01C 21/005 701/412 |
| 2009/0005018 | A1* | 1/2009 | Forstall | H04M 3/42348 455/414.1 |
| 2009/0197617 | A1* | 8/2009 | Jayanthi | G01C 21/3438 455/456.2 |
| 2010/0019990 | A1 | 1/2010 | Lee | |
| 2010/0082231 | A1* | 4/2010 | Chang | G01C 21/3688 701/533 |
| 2010/0262360 | A1* | 10/2010 | Hilliar Isaacson | G01C 21/20 701/532 |
| 2010/0325194 | A1* | 12/2010 | Williamson | H04W 4/02 709/203 |
| 2011/0022303 | A1* | 1/2011 | Sprigg | G01C 21/343 701/533 |
| 2011/0153742 | A1* | 6/2011 | Sloop | G01C 21/3691 709/204 |
| 2012/0008526 | A1* | 1/2012 | Borghei | H04W 4/08 370/254 |
| 2013/0130726 | A1* | 5/2013 | Deng | H04M 1/72572 455/457 |
| 2013/0254413 | A1* | 9/2013 | Steele | H04L 67/1068 709/228 |
| 2014/0229105 | A1* | 8/2014 | Lee | G01C 21/3407 701/533 |
| 2014/0365901 | A1* | 12/2014 | Moha | G01C 21/367 715/738 |
| 2014/0365944 | A1* | 12/2014 | Moore | G06F 3/0484 715/772 |

FOREIGN PATENT DOCUMENTS

| | | | |
|---|---|---|---|
| CN | 101039476 A | 9/2007 | |
| CN | 101621738 A | 1/2010 | |
| CN | 101800931 A | 8/2010 | |
| CN | 101959125 A | 1/2011 | |
| CN | 102176770 A | 9/2011 | |
| CN | 102264029 A | 11/2011 | |
| CN | 102740228 A | 10/2012 | |
| CN | WO 2012155445 A1 * | 11/2012 | ............ H04W 4/028 |
| CN | 103516751 A | 1/2014 | |

OTHER PUBLICATIONS

Chinese Office Action issued in corresponding Chinese Application No. 201310027273.0 dated Jun. 16, 2017.

* cited by examiner

… (1)

NAVIGATION METHOD, DEVICE FOR NAVIGATION AND NAVIGATION SYSTEM

CROSS REFERENCE TO RELATED APPLICATION

This application is a continuation application of PCT Patent Application No. PCT/CN2014/070259, entitled "NAVIGATION METHOD, DEVICE FOR NAVIGATION AND NAVIGATION SYSTEM" filed on Jan. 7, 2014, which claims priority to Chinese Patent Application No. 201310027273.0, filed on Jan. 24, 2013, entitled "NAVIGATION METHOD, DEVICE FOR NAVIGATION AND NAVIGATION SYSTEM", the disclosure of which is hereby incorporated by reference in its entirety.

TECHNICAL FIELD

The disclosure relates to a communication technique. In particular, the disclosure relates to a navigation method, a device for navigation and a navigation system.

BACKGROUND ART

Currently, a map-based service is increasingly concerned and a variety of products respectively promotes a variety of location-based service. BaiDu Map (BaiDu is a registered trademark of BaiDu Corporation in China) provides a location-sharing service, by which a user can invite friends to share location information, share with friends the location information of his own, or set existing location-sharing contacts. Google Latitude provides an active sharing mode and increases a function of recording personal track so that a user can report the user's current location through a cell phone and view the location reported by a friend and himself history location information. iPhone provides an application which is named "Find My Friends" through which a location tracking function can be implemented among a plurality of cell phones.

However, the prior art above can only provide the location information of the users for sharing and cannot provide navigation service.

SUMMARY OF INVENTION

In order to achieve a location-based navigation server, the disclosure proposes a navigation method, a device for navigation and a navigation system. The disclosure is as follows:

According to an aspect of the disclosure, the disclosure provides a navigation method, which comprises: performing a location processing on a first terminal to obtain the location of the first terminal; acquiring a location of a second terminal; navigating the second terminal based on navigation information from the location of the second terminal to a target location, wherein the target location is a predetermined location or a current location of the first terminal.

According to another aspect of the disclosure, the disclosure provides a navigation method, which comprises: a server acquires the navigation information from the location of the second terminal to a target location, wherein the target location is a predetermined location or the current location of the first terminal; and the server sends the acquired navigation information to the second terminal to permit navigation.

According to still another aspect, the disclosure provides a first terminal for navigation, which comprises: a locating module for performing a location processing on a first terminal to obtain a location of the first terminal; an acquiring module for acquiring a location of a second terminal; and a navigating module for navigating the second terminal based on navigation information from the location of the second terminal to a target location, wherein the target location is a predetermined location or a current location of the first terminal.

According to still another aspect, the disclosure provides a server for navigation, which comprises: an acquiring module for acquiring navigation information from the location of the second terminal to a target location, wherein the target location is a predetermined location or a current location of the first terminal; and a sending module for sending the acquired navigation information to the second terminal to permit navigation.

According to still another aspect, the disclosure provides a navigation system comprising the first terminal and the server as mentioned above.

The technical solution according to the disclosure can navigate the second terminal based on the navigation information from the location of the second terminal to the target location by performing the location processing on the first terminal to obtain the location of the first terminal and acquiring the location of the second terminal, so as to implement the location-based navigation service and solve the problem that the prior art cannot perform navigation but only provide location-sharing. The technical solution of the present disclosure incorporates the location service and navigation function to meet the requirement of the users and improve the function of location service so that the convenience and applicability of the location service is enhanced.

BRIEF DESCRIPTION OF THE DRAWINGS

In order to describe the embodiments of the disclosure more clearly, a brief description on the drawings which are made reference to in describing the present disclosure will be made below. Apparently, the drawings described below are only some embodiments of the disclosure and other drawings can be conceived based on the drawings described by the person skilled in the art without paying any inventive effort.

DETAILED DESCRIPTION

Hereinafter, a detail description on the embodiments of the present disclosure will be further made with reference to the drawings so as to make the objection, the technical solution and advantages of the present disclosure more apparent.

Embodiment 1

Figure 1:
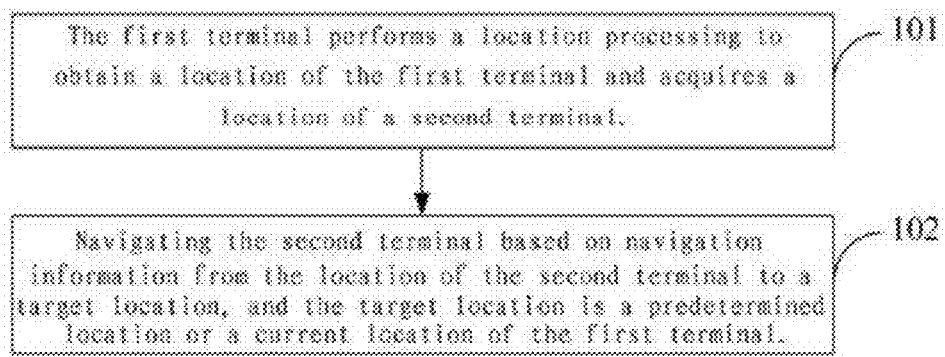
FIG. 1 is a flowchart illustrating a navigation method according to Embodiment 1 of the present disclosure.

Referring to FIG. 1, the embodiment provides a navigation method implemented in a first terminal, specifically including the following steps: 101: the first terminal performs a location processing to obtain a location of the first terminal and acquires a location of a second terminal; and 102: navigating the second terminal based on navigation information from the location of the second terminal to a target location, wherein the target location is a predetermined location or a current location of the first terminal.

Figure 2:
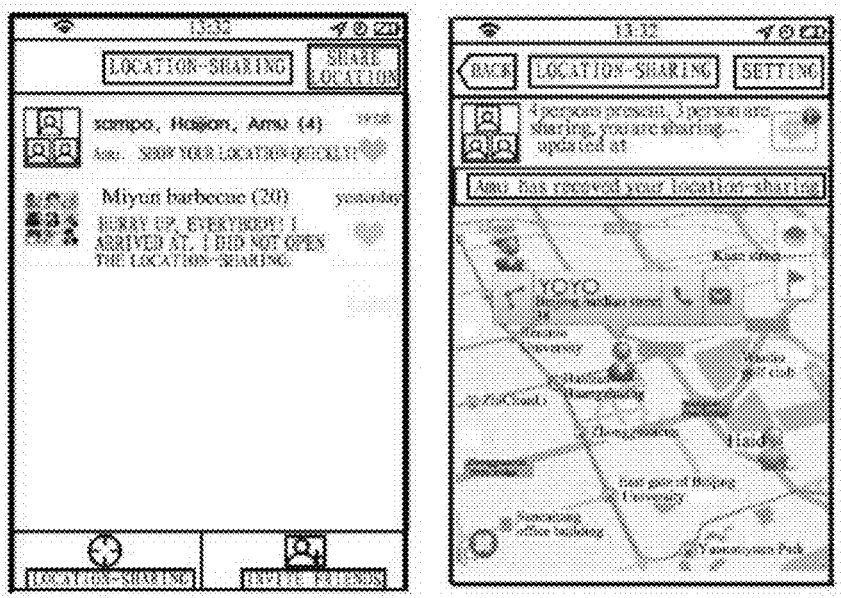
FIG. 2 is a diagram illustrating a group location-sharing and navigation provided by Embodiment 1 of the present disclosure.

The method above can be implemented between any two terminals. It shall be noted that the method can be implemented between two terminals belonging to a group. For example, FIG. 2 is a diagram illustrating the method applied in a group. In FIG. 2, a group includes 4 terminals, i.e. sampo, Haijian, Amu and YOYO. The figure shows that User sampo have invited three friends to share location and three shared locations have been marked clearly in a map interface so that the user can view the location information of respective friend easily and provide the friends with navigation.

In the embodiment, the first terminal can transmit navigation information to the second terminal in a form of text or voice while implementing the location-sharing between the second terminal and itself. For example, the first terminal can send a short message to the second terminal so as to supply route information from the second terminal to a target location in a form of text; or the first terminal can call the second terminal so as to supply route information from the second terminal to a target location in a form of voice, and so on.

Additionally, in the embodiment, the first terminal can also compute the distance from the second terminal to a target location while implementing the location-sharing between the second terminal and itself and view the distance at any time to keep track of the location change of the second terminal in time.

In the embodiment, sharing the location information between the first terminal and the second terminal can be implemented in a message-push function. The two parties can share an opposite party location information to each other by receiving the push-message from the opposite party. Generally, the location information shared by the first terminal and the second terminal indicates the geographic location information in a form of text. Further, the location information shared may include other information related to location, such as ID of the fiend, coordinate of latitude, and reverse geographic location information, etc., which are invisible to the user in general and the terminals can show exactly the location condition of the opposite party in an interface based on the other information so as to enhance the effect of location-sharing.

In the embodiment, the method above further comprises: transmitting the location of the first terminal to the second terminal so as to share the location with the second terminal.

In the embodiment, to provide the second terminal with navigation based on the navigation information from the location of the second terminal to the target location comprises transmitting a request to the server to request to generate the navigation information from the location of the second terminal to the target location, causing the server to acquire the navigation information from the location of the second terminal to the target location, and sending the navigation information to the second terminal to perform a navigation processing.

In the embodiment, to provide the second terminal with navigation based on the navigation information from the location of the second terminal to the target location comprises receiving the route information from the location of the second terminal to the target location which is drawn (i.e., indicated or specified) by the user of the first terminal and transmitting the route information to the second terminal to perform a navigation processing.

Further, receiving the route information from the location of the second terminal to the target location which is drawn by the user of the first terminal and transmitting the route information to the second terminal to perform a navigation processing comprises receiving the route information from the location of the second terminal to the target location which is drawn by the user of the first terminal, transmitting the route information to the server, causing the server to generate corresponding navigation information based on the route information, and sending the generated navigation information to the second terminal to perform a navigation processing.

In the embodiment, to provide the second terminal with navigation based on the navigation information from the location of the second terminal to the target location comprises transmitting a request to the server to request to generate the navigation information from the location of the second terminal to a first location, causing the server to acquire a first navigation information from the location of the second terminal to the first location, receiving route information from the first location to the target location which is drawn by the user of the first terminal, generating navigation information based on the first navigation and the route information and sending the generated navigation information to the second terminal to perform a navigation processing, wherein the first location is any one location from the location of the second terminal to the target location.

In the embodiment, to provide the second terminal with navigation based on the navigation information from the location of the second terminal to the target location comprises receiving route information from the location of the second terminal to a second location which is drawn by the user of the first terminal, transmitting a request to the server to request to generate the navigation information from the second location to the target location, causing the server to acquire a second navigation information from the second location to the target location, generating navigation information based on the second navigation and the route information and sending the generated navigation information to the second terminal to perform a navigation processing, wherein the second location is any one location from the location of the second terminal to the target location.

In the embodiment, to provide the second terminal with navigation based on the navigation information from the location of the second terminal to the target location comprises receiving a first route information from the location of the second terminal to a third location and a second route information from a fourth location to the target location which are drawn by the user of the first terminal, transmitting a request to the server to request to generate the navigation information from the third location to the fourth location, causing the server to acquire a third navigation information from the third location to the fourth location, generating navigation information based on the first route information, the second route information and the third navigation information and sending the generated navigation information to the second terminal to perform a navigation processing, wherein the third location and the fourth location are any locations from the location of the second terminal to the target location and different from each other.

In the embodiment, before performing the location processing to obtain the location of the first terminal, the first terminal transmits an invitation that invites the second terminal to share locations with the first terminal, wherein the request includes the number and specified identification of the second terminal and the specified identification is used to acquire the number of the first terminal. Then, the first terminal performs the location processing to obtain the location of the first terminal after receiving an acknowledgement of the request from the second terminal.

The above method of the present disclosure performs the location processing to obtain the location of the first terminal, acquires the location of the second terminal and provides the navigation with the second terminal based on the navigation information from the location of the second terminal to the target location. The method achieves the location-based navigation service, eliminates the problem that the prior art cannot provide the navigation service but only provide the location-sharing. The method of the disclosure incorporates the location service and the navigation function so as to meet sufficiently the requirements of users and enhance location service function, convenience for use and applicability. Additionally, the method of the disclosure achieves a cross-platform sharing which can cause any type of terminals to use the real-time location-sharing and expand the range of the users. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing and reduce the difficulty in use and make the location-based service easily, quickly and conveniently.

Embodiment 2

Figure 3:
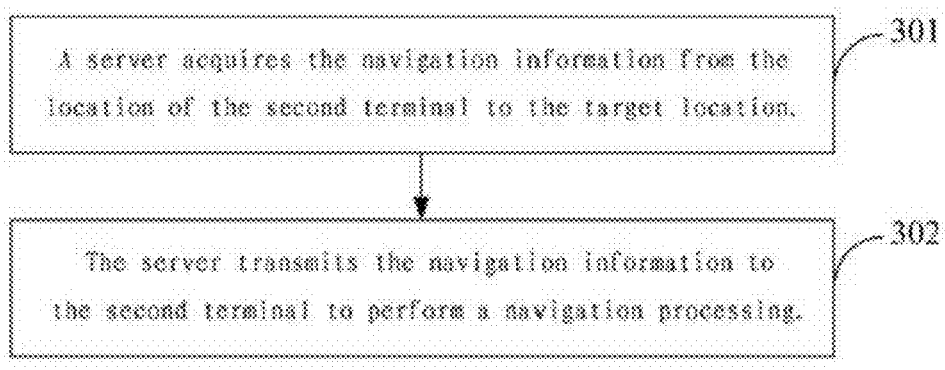
FIG. 3 is a flowchart illustrating a navigation method according to Embodiment 2 of the present disclosure.

Referring to FIG. 3, the embodiment provides a navigation method implemented in a server, specifically including the following steps: 301: a server acquires the navigation information from the location of the second terminal to the target location, wherein the target location is a predetermined location or the current location of the first terminal; and 302: the server transmits the navigation information to the second terminal to perform a navigation process.

In the method above, the first terminal and the second terminal may be any two terminals. In one condition, the first terminal and the second terminal may be two terminals belonging to same one group. For example, in a group including 5 terminals, terminal A may invite a friend, terminal B, to join the location-sharing, and the two parties can share location information in real time after terminal B accepts the invitation. Further, after acquiring the navigation information from terminal B to terminal A, the server will transmit the navigation information to terminal B so that terminal B can reach terminal A conveniently and quickly.

In the embodiment, the step of the server acquiring the navigation information from the location of the second terminal to the target location comprises that the server receives, from the first terminal, a request for generating navigation information based on the location of the first terminal and the target location and that the server acquires the navigation information from the location of the second terminal to the target location.

In the embodiment, the step of the server acquiring the navigation information from the location of the second terminal to the target location comprises that the server receives the route information from the location of the second terminal to the target location which is drawn by the user and is sent by the first terminal and generates the navigation information based on the route information.

Further, the server can transmit the navigation information to the first terminal. After the user of the first terminal confirmed the transmitted navigation information, the server can transmit the confirmed navigation information to the second terminal to perform a navigation processing.

In the embodiment, the step of the server acquiring the navigation information from the location of the second terminal to the target location comprises receiving a request for generating the navigation information from the location of the second terminal to a first location from the first terminal, acquiring a first navigation information from the location of the second terminal to a first location, receiving a route information from the first location to target location which is drawn by the first terminal, and generating navigation information based on the first navigation information and the route information, wherein, the first location is any one location from the location of the second terminal to the target location.

In the embodiment, the step of the server acquiring the navigation information from the location of the second terminal to the target location comprises receiving a route information from the location of the second terminal to a second location which is drawn by the user of the first terminal, receiving a request for generating navigation information from the second location to the target location from the first terminal, acquiring the second navigation information from the second location to the target location and generating the navigation information based on the route information and the second navigation information, the second location is any one location from the location of the second terminal to the target location.

In the embodiment, the step of the server acquiring the navigation information from the location of the second terminal to the target location comprises receiving a first route information from the location of the second terminal to a third location and a second route information from a fourth location to the target location which are drawn by the user of the first terminal, receiving a request for generating navigation information from the third location to the fourth location from the first terminal, acquiring a third navigation information from the third location to the fourth location, generating navigation information based on the first route information, the second route information and the third navigation information, wherein the third location and the fourth location are any locations from the location of the second terminal to the target location and are different from each other.

In the embodiment, the method above further comprises that the server receives a request for sharing the location with the second terminal from the first terminal, which the request includes the number and the specified identification of the second terminal, and that the server acquires the number of the first terminal based on the specified identification and transmits the number of the first terminal and the request to the second terminal together.

The above method according to the present embodiment accomplished the location-based navigation service by the server acquiring the navigation information from the location of the second terminal to the target location and transmitting the navigation information to the second terminal to perform the navigation, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

Embodiment 3

Figure 4:
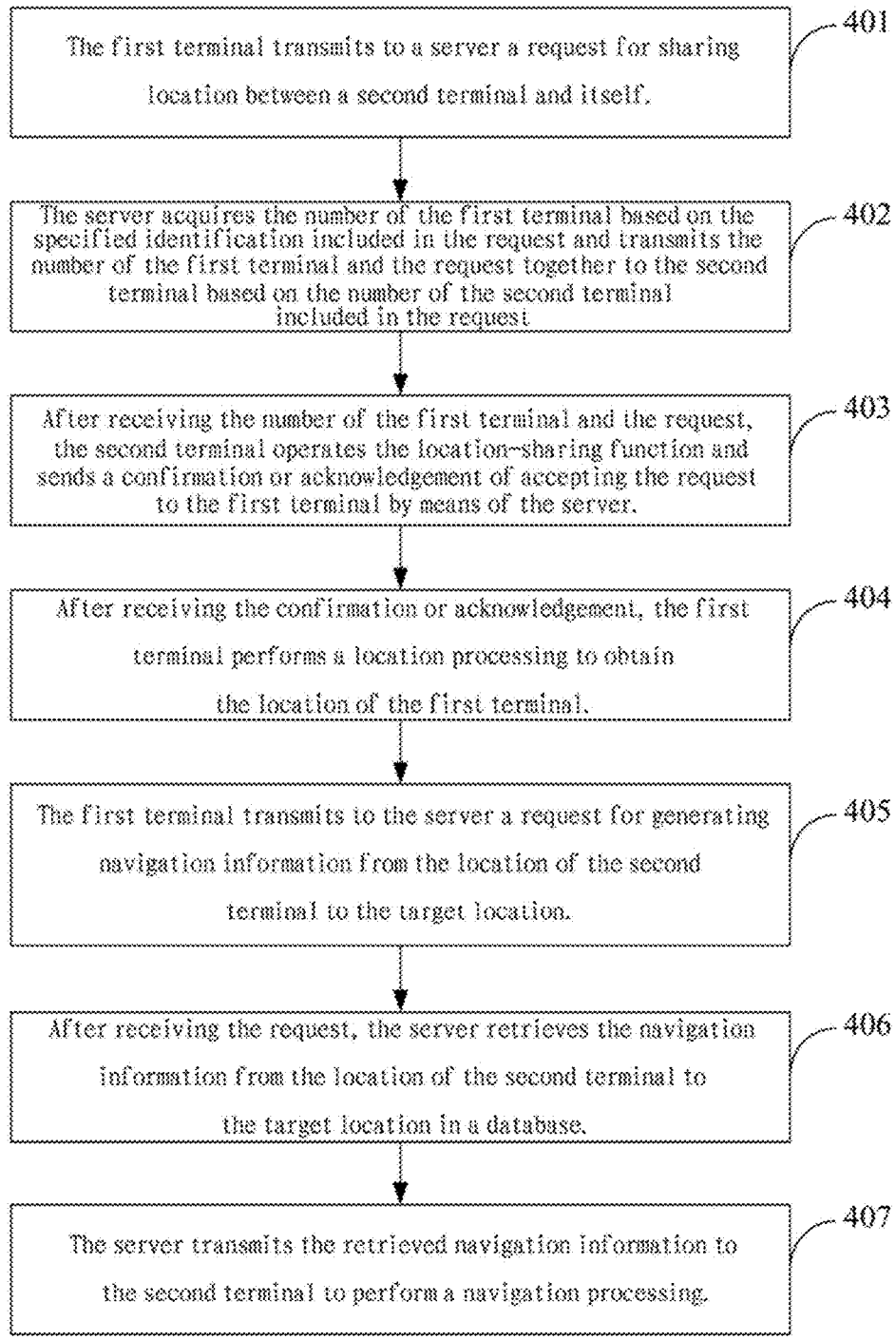
FIG. 4 is a flowchart illustrating a navigation method according to Embodiment 3 of the present disclosure.

Referring to FIG. 4, the embodiment provides a navigation method used for a first terminal and a server, the method comprises steps 401-407.

At step 401, the first terminal transmits to a server a request for sharing location between a second terminal and itself. The request includes the number and a specified identification of the second terminal and the specified identification is used by the server to acquire the number of the first terminal.

In the embodiment, the specified identification may be preset in any form such as a set of special digitals, symbols, alphabets or any combination thereof.

At step 402, after receiving the request for the location-sharing from the first terminal, the server acquires the number of the first terminal based on the specified identification included in the request and transmits the number of the first terminal and the request together to the second terminal based on the number of the second terminal included in the request.

At step 403, after receiving the number of the first terminal and the request, the second terminal operates the location-sharing function and sends a confirmation or acknowledgement of accepting the request to the first terminal by means of the server.

At step 404, after receiving confirmation or acknowledgement of accepting the request from the second terminal, the first terminal performs a location processing to obtain the location of the first terminal, transmits the location of the first terminal to the second terminal, and acquires the location of the second terminal so as to share locations with the second terminal.

At step 405, the first terminal transmits to the server a request for generating navigation information from the location of the second terminal to the target location.

In the embodiment, a navigation button may be set in a map interface of the first terminal and the user of the first terminal may transmit the request to the server by clicking the navigation button so as to provide the second terminal with the navigation service, which is easy and convenience to operate.

Figure 5:
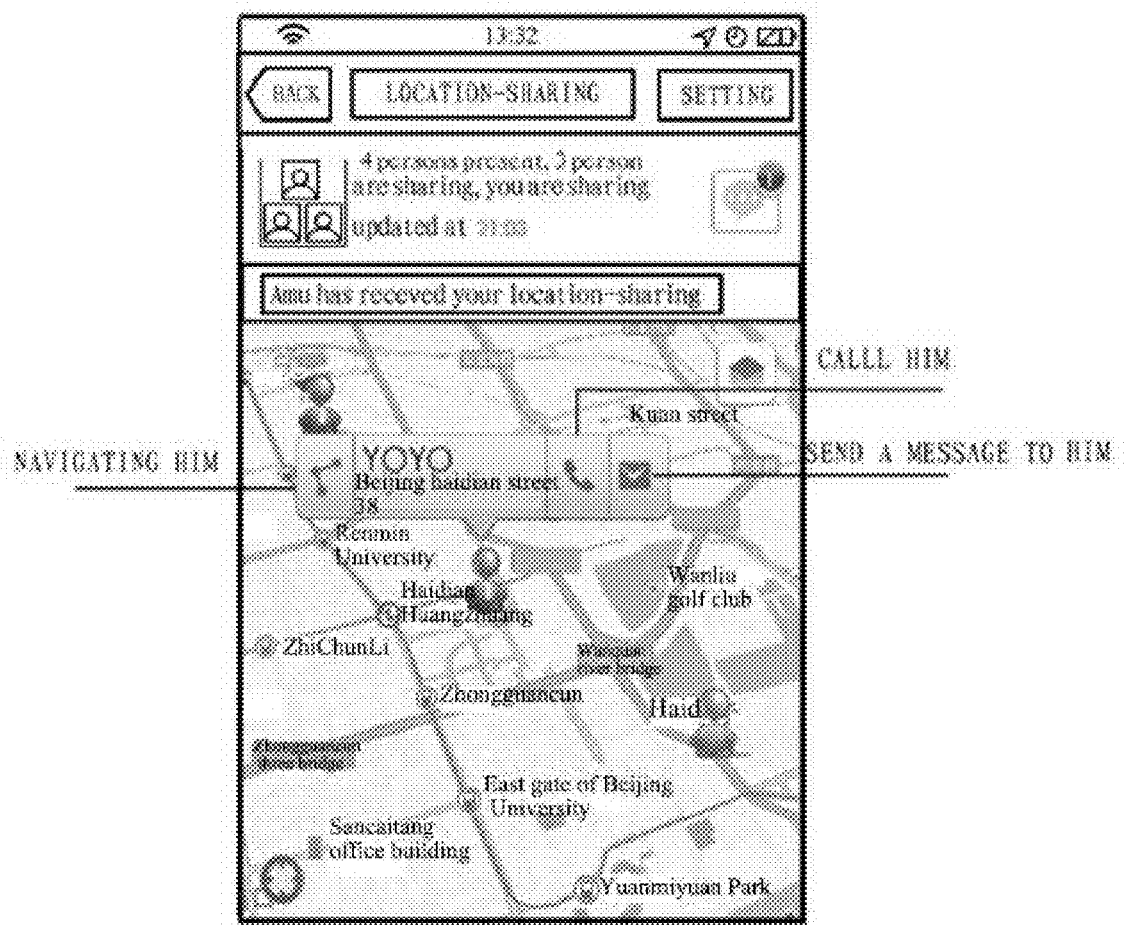
FIG. 5 is a diagram illustrating a navigation interface provided by Embodiment 3 of the present disclosure.

For example, FIG. 5 is a diagram of a navigation interface according to the embodiment. As shown, after accomplishing the location-sharing in a group, locations information of friends are shown in the map interface. A navigation button is shown on the left to the location information and the user can click the navigation button to provide navigation with the friends. A calling button and a messaging button are shown on the right to the location information and the user can click the calling button to call the friend to provide navigation with him. Alternatively, user can click the messaging button to send a message to the friend to provide navigation with him.

At step 406, after receiving the request for generating navigation information from the first terminal, the server retrieves the navigation information from the location of the second terminal to the target location in a database. The target location may be a predetermined location or the location of the first terminal. For example, in a condition, terminal A and terminal B perform location sharing. Terminal A sets a target location as the common destination of both parties, such as a restaurant and transmit the navigation information from terminal B to the restaurant to terminal B based on the current location of terminal B so that terminal B arrives at the restaurant as soon as possible. In another condition, terminal C and terminal D perform location sharing. Terminal C sets its current location as a target location and transmits the navigation information from terminal D to terminal C to terminal D based on the current location of terminal D so that terminal D arrives at the location of terminal C restaurant as soon as possible to meet terminal C.

At step 407, the server transmits the retrieved navigation information to the second terminal to perform a navigation processing.

The above method according to the present embodiment accomplished the location-based navigation service by performing the location processing to obtain the location of the location of the first terminal, acquiring the location of the second terminal and the navigation information from the location of the second terminal to the target location to perform the navigation, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

Embodiment 4

Figure 6:
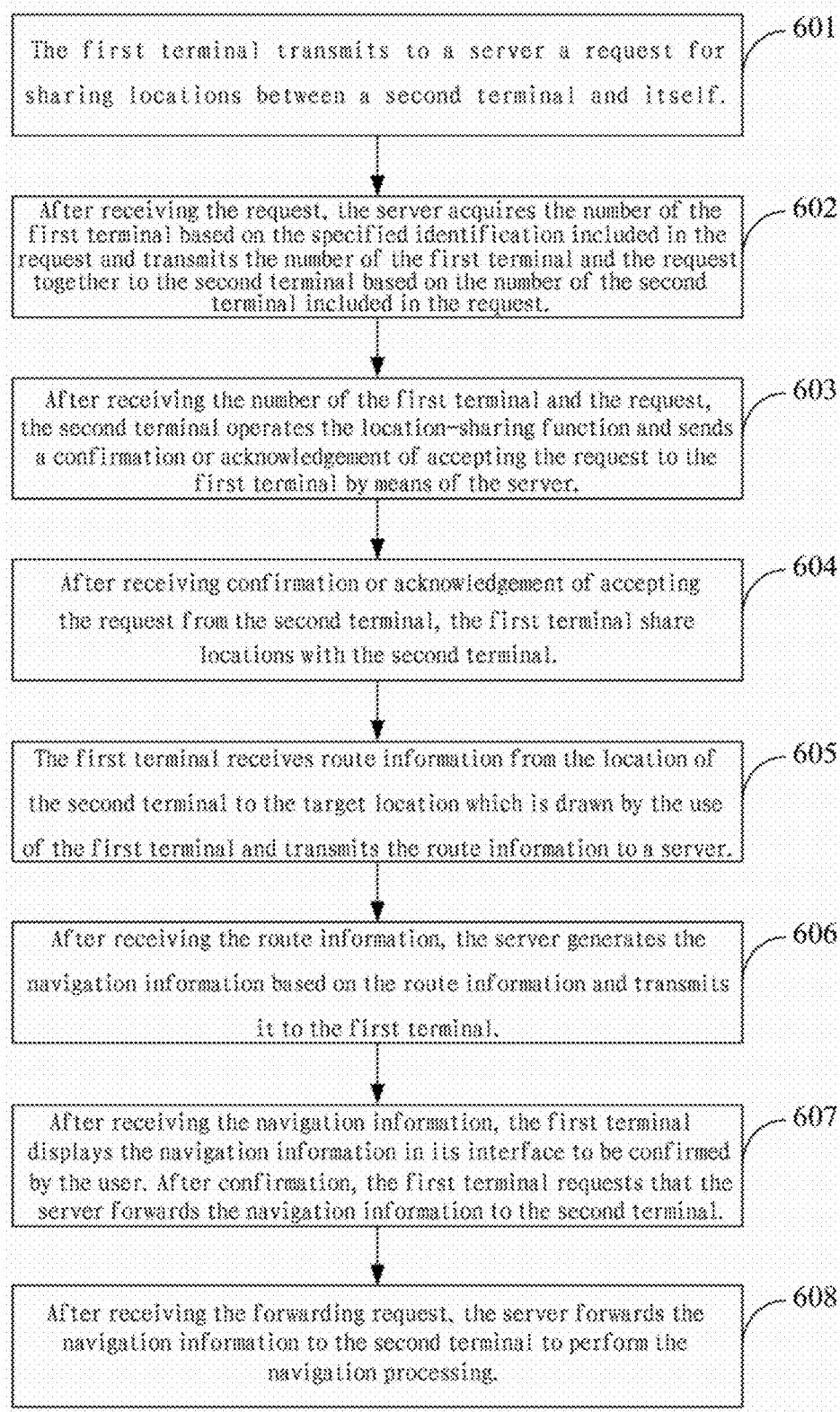
FIG. 6 is a flowchart illustrating a navigation method according to Embodiment 4 of the present disclosure.

Referring to FIG. 6, the embodiment provides a navigation method used for a first terminal and a server, the method is different from Embodiment 3 in that the navigation is performed not in an automatic mode but in a hand-drawing mode. The method of Embodiment 4 comprises steps 601-608.

At step 601, the first terminal transmits to a server a request for sharing location between a second terminal and itself. The request includes the number and a specified identification of the second terminal and the specified identification is used by the server to acquire the number of the first terminal.

In the embodiment, the specified identification may be preset in any form such as a set of special digitals, symbols, alphabets or any combination thereof.

At step 602, after receiving the request for the location-sharing from the first terminal, the server acquires the number of the first terminal based on the specified identification included in the request and transmits the number of the first terminal and the request together to the second terminal based on the number of the second terminal included in the request.

At step 603, after receiving the number of the first terminal and the request, the second terminal operates the location-sharing function and sends a confirmation or acknowledgement of accepting the request to the first terminal by means of the server.

At step 604, after receiving confirmation or acknowledgement of accepting the request from the second terminal, the first terminal performs a location processing to obtain the location of the first terminal, transmits the location of the first terminal to the second terminal, and acquires the location of the second terminal so as to share locations with the second terminal.

At step 605, the first terminal receives route information from the location of the second terminal to the target location which is drawn by the use of the first terminal and transmits the route information to a server. The target location is a predetermined location or the current location of the first terminal.

In the embodiment, a button for drawing a navigation route may be set in a map interface of the first terminal. The user of the first terminal may draw route information by clicking the button and send the route information to the server by means of the first terminal so that the server can generate corresponding navigation information based on the route information.

In the embodiment, there are a variety of modes for drawing the route information. For example, the route information may be obtained by clicking several key points between a start point and an end point through a finger of the user or by drawing a route from the start point to the end point through the finger of the user and so on. However, the mode for drawing the route information is not limited thereto.

In the embodiment, after the terminal is selected to provide the other party with navigation, its interface can show two buttons simultaneously for the user's selection. The one button is for triggering the server to retrieve the navigation information and the other for the user triggering the user to draw route information in hand on which the server generates navigation information based.

Figure 7:
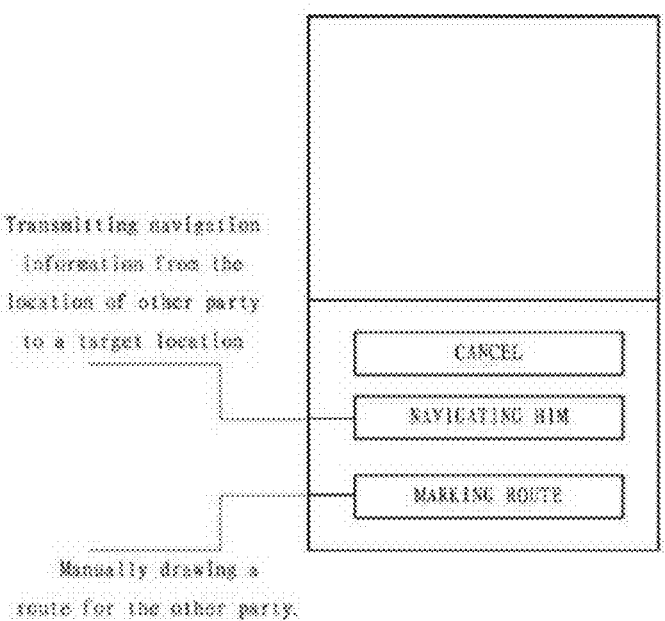
FIG. 7 is a diagram illustrating a selection of navigation mode provided by Embodiment 4 of the present disclosure.

For example, FIG. 7 is a diagram of an interface for selecting navigation modes according to the present embodiment. After the user of terminal A chooses to provide terminal B of the other party with navigation, the interface shows one button "navigating him" which is used to provide navigation with terminal B and another button "marking route" which is used by the user to draw a route to provide navigation with terminal B.

Figure 8:
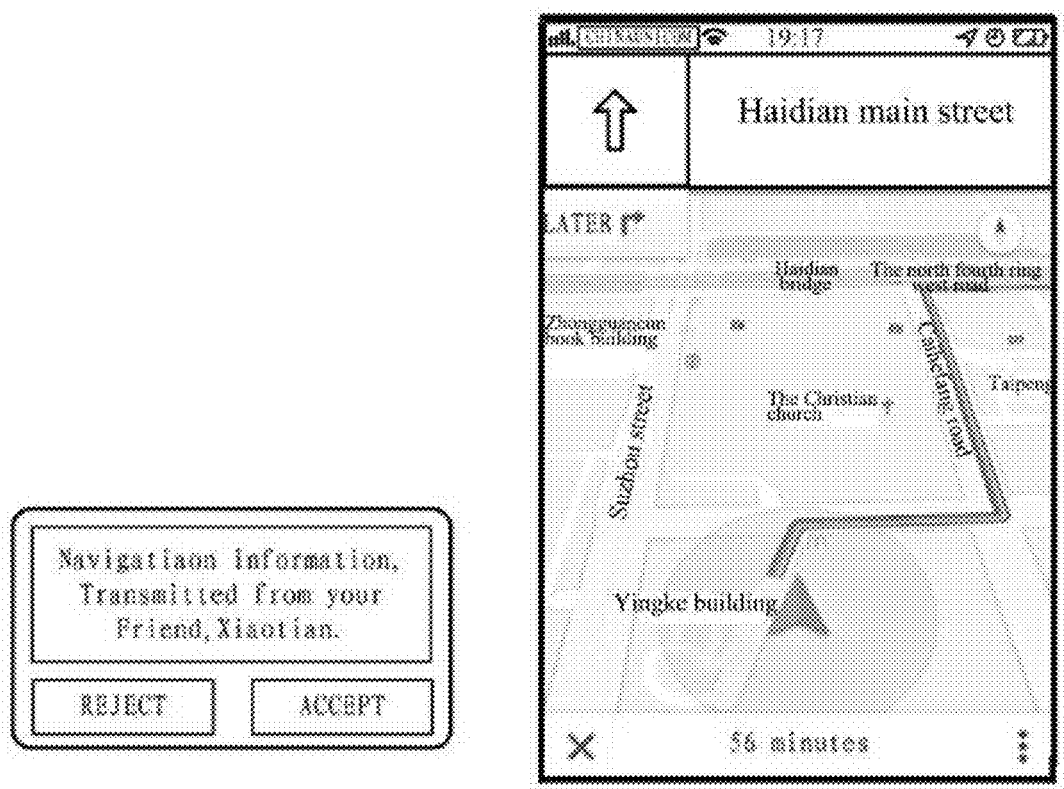
FIG. 8 is a diagram illustrating an interface after selecting an automatic navigation mode in the interface of FIG. 7.

Under a condition, if the user of terminal A clicks the button "navigating him", an operation of sending a request to the server will be triggered to perform the flow as described with respect to Embodiment 3, i.e. the server automatically searches for the navigation information from the location of the other party to the target location and transmits the navigation information to terminal B. At this time, the other party, terminal B will receive a message. The user of terminal B may choose to accept or refuse the navigation information. If the user chooses to accept the navigation information, the interface of terminal B will display the navigation information, as shown in FIG. 8.

Figure 9:
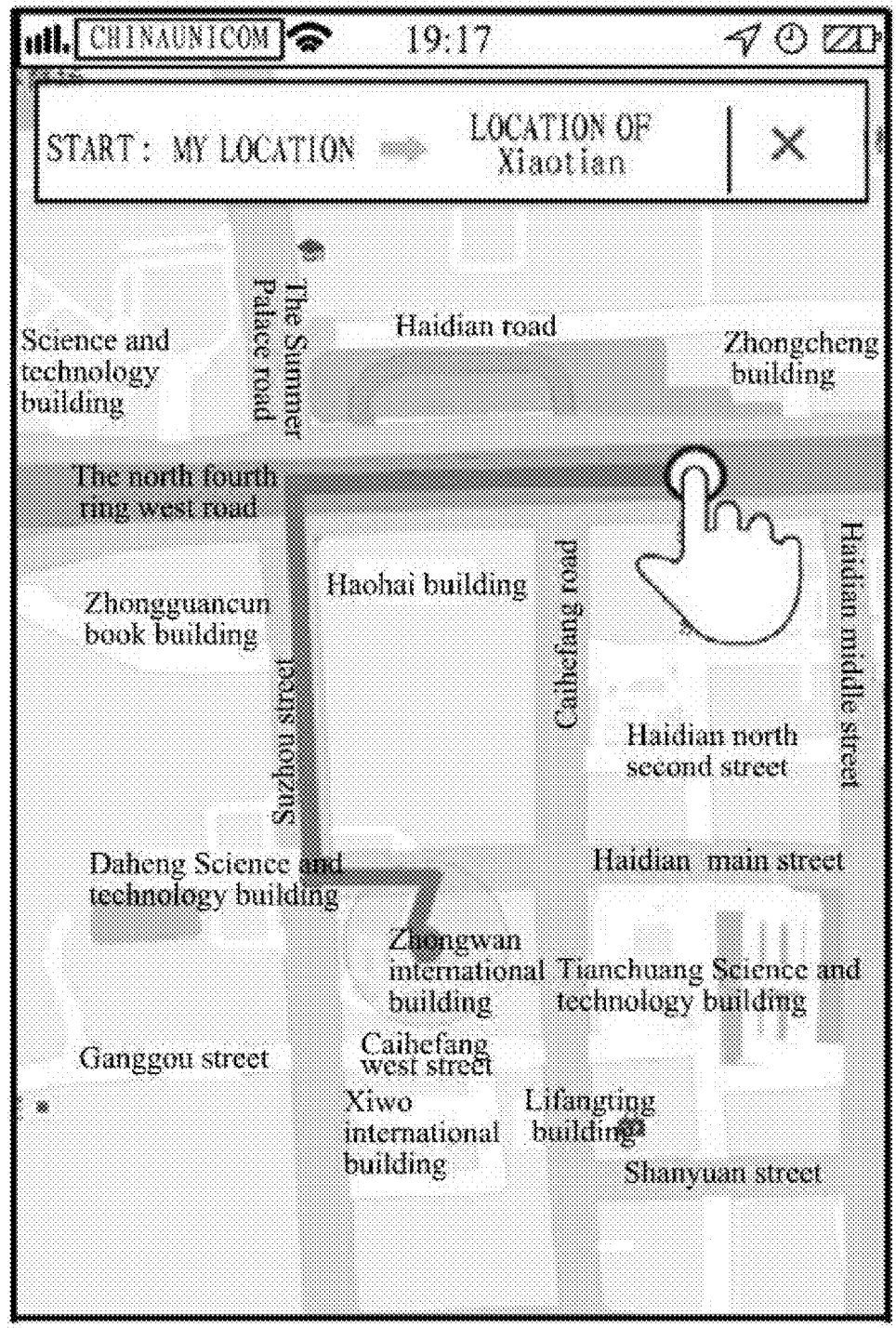
FIG. 9 is a diagram illustrating an interface after selecting a hand-drawing navigation mode in the interface of FIG. 7.

Under another condition, if the user of terminal A presses the button "marking route", the current map interface will be in an editable state. In such state, the user may click point several locations from the start point to the end point and then terminal A transmits the location information of the clicked point to the server. The server generates corresponding navigation information and returns it to terminal A. The user of terminal A can view the route in the map interface immediately, as shown in FIG. 9. Additionally, the user of terminal A can choose to transmit the route after confirming the route returned by the server so as to trigger the server to transmit the navigation information to the other party, terminal B, to navigate terminal B.

At step 606, after receiving the route information, the server generates the navigation information based on the route information and transmits it to the first terminal.

In the embodiment, the route information is location-related information which is obtained based on the drawing result of the user. The location-related information may be the coordination information of a plurality of points or information of a track, and so on. The navigation information is the one computed by the server based on the route information, like track information, which is displayed in the map interface of the terminal to be viewed by the user.

At step 607, after receiving the navigation information, the first terminal displays the navigation information in the interface to be confirmed by the user. After the user of the first terminal confirmed to transmit the navigation information, a message is transmitted to the server to request the server forward the navigation information to the second terminal.

At step 608, after receiving the message, the server forwards the navigation information to the second terminal to perform the navigation processing.

The above method according to the present embodiment accomplished the location-based navigation service by performing the location processing to obtain the location of the location of the first terminal and acquiring the location of the second terminal and using the navigation information from the location of the second terminal to the target location to perform the navigation, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

Embodiment 5

The present embodiment incorporates the automatically acquiring navigation information and the user drawing route information so as to provide the following several solutions.

Figure 10:
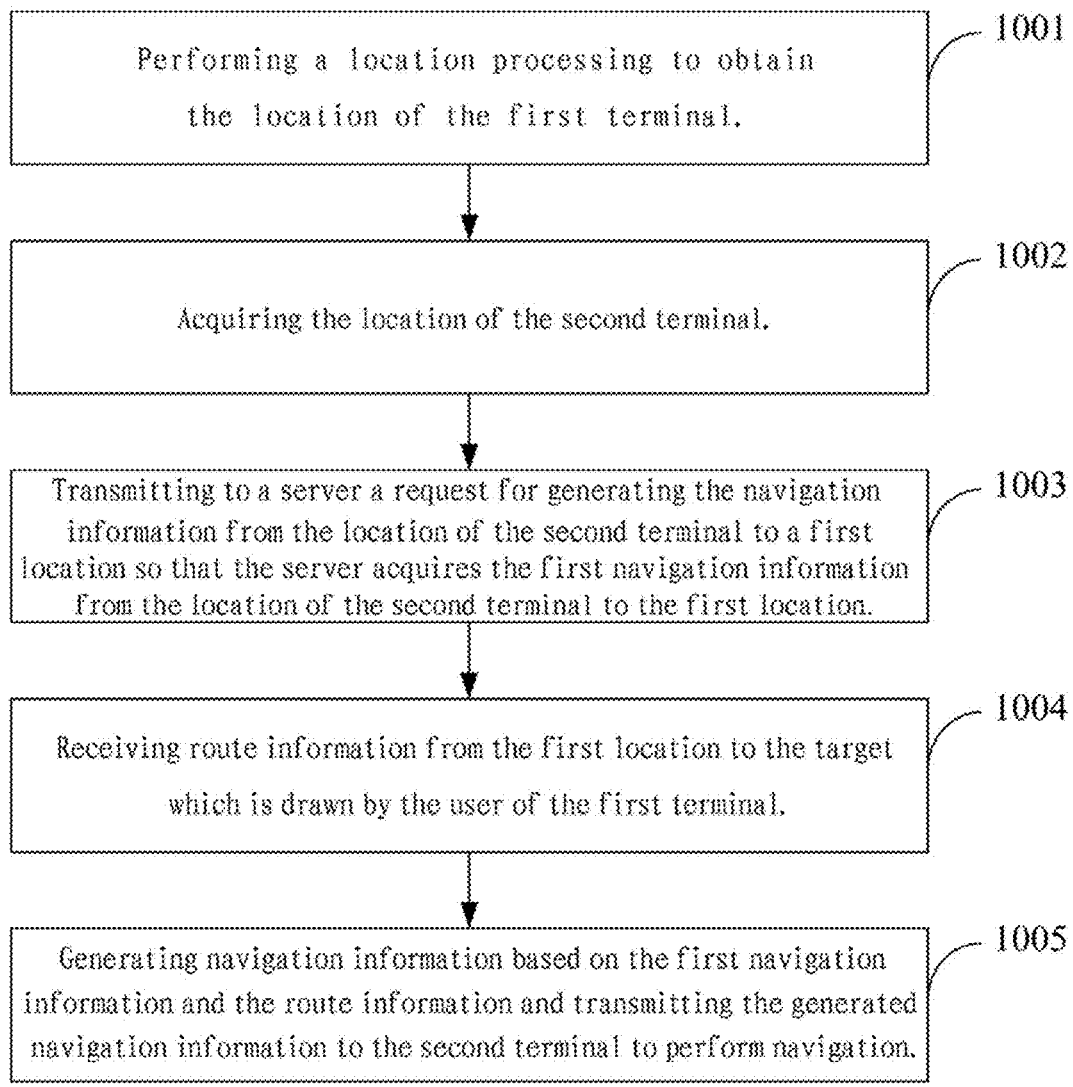
FIG. 10 is a flowchart illustrating a navigation method according to Embodiment 5 of the present disclosure.

The first aspect, as shown in FIG. 10, provides a navigation method, which comprises performing a location processing to obtain the location of the first terminal (step 1001), acquiring the location of the second terminal (step 1002), transmitting to a server a request for generating the navigation information from the location of the second terminal to a first location so that the server acquires the first navigation information from the location of the second terminal to the first location (step 1003), receiving route information from the first location to the target which is drawn by the user of the first terminal (step 1004), generating navigation information based on the first navigation information and the route information and transmitting the generated navigation information to the second terminal to perform navigation (step 1005), wherein the first location is any one location from the location of the second terminal to the target location.

The method depicted in FIG. 10 may be applied in the circumstance in which the front part of the route is navigated automatically by the server and the latter part of the route is navigated by the user hand-drawing route information. By doing this, a large part of the route can be navigated automatically by the server so as to help the user rapidly reach the vicinity of the target location, which improves the navigation speed. The last part of the route is accurately navigated by using the route information hand-drawn by the user so as to help the user exactly find the target location, which improves the accuracy of the navigation. If the user of the second terminal is not favorite with the last part of the route on how to reach the target location, such a solution mentioned above may be implemented.

For example, the location of the second terminal is a location A of a company, the target location is a location B of a restaurant, and location M is a location of a subway entrance between locations A and B which is nearer to the location B. By the method as described above, the route between the locations A and M may be navigated automatically by the server at first and then the route between the locations M and B is accurately navigated by using the route information drawn by the user so as to help the second terminal arrive the target location B rapidly and exactly.

Figure 11:
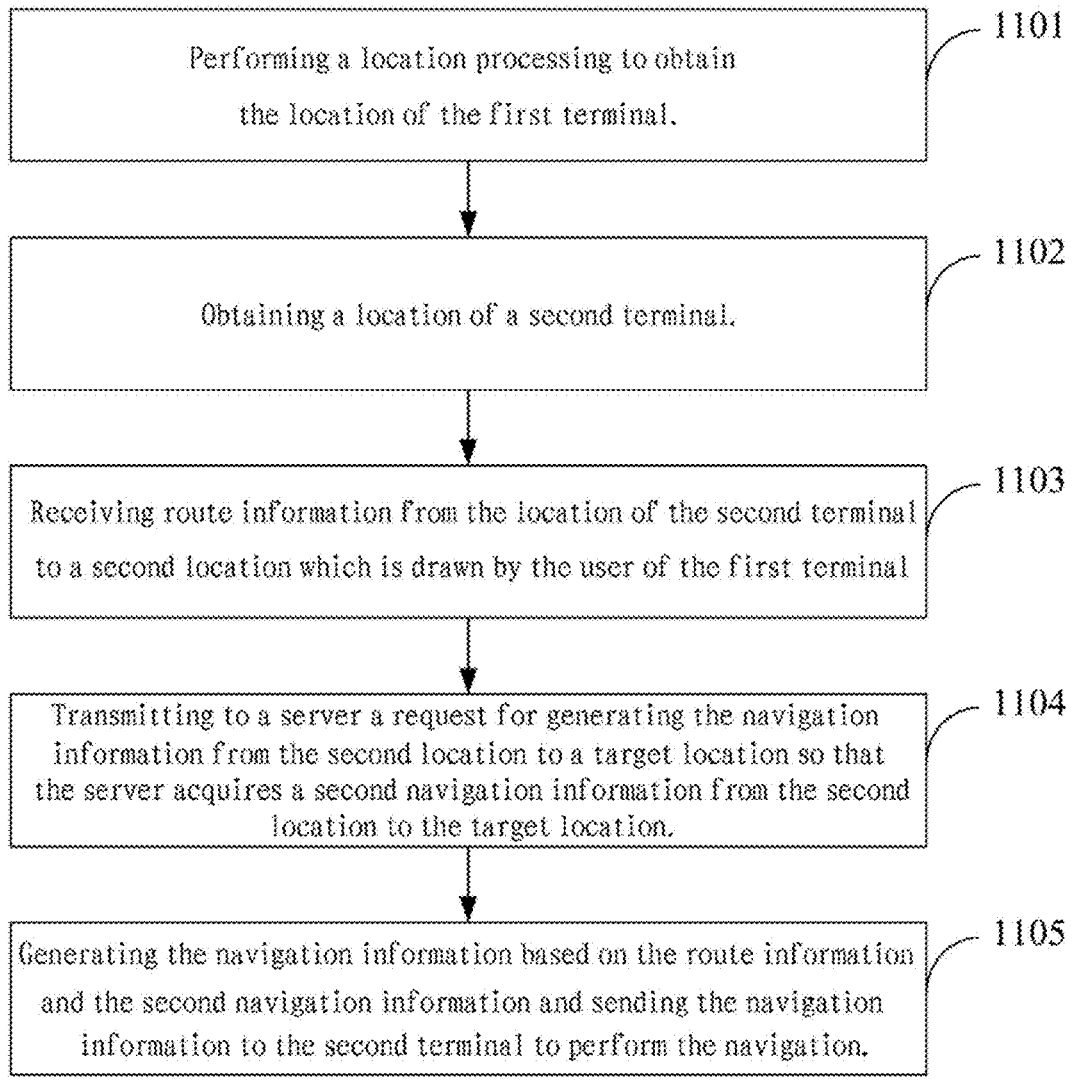
FIG. 11 is a flowchart illustrating another navigation method according to Embodiment 5 of the present disclosure.

The second aspect, as shown in FIG. 11, provides a navigation method, which comprises performing a location processing to obtain the location of the first terminal (step 1101); acquiring a location of a second terminal (step 1102); receiving route information from the location of the second terminal to a second location which is drawn by the user of the first terminal (step 1103); transmitting to a server a request for generating the navigation information from the second location to a target location so that the server acquires a second navigation information from the second location to the target location (step 1104), generating the navigation information based on the route information and the second navigation information and sending the navigation information to the second terminal to perform the navigation (step 1105); wherein, the second location is any one location from the location of the second terminal to the target location.

The method depicted in FIG. 11 may be applied in the circumstance in which the front part of the route is navigated by the user hand-drawing route information and the latter part of the route is navigated automatically by the server. By doing this, the small beginning part of the route can be accurately navigated by using the route information hand-drawn by the user so as to help the user exactly find a location in the vicinity of the start point, which improves the accuracy of the navigation. And then, the last large part of the route can be rapidly navigated automatically by the server so as to help the user rapidly reach the target location. If the user of the second terminal is not favorite with the start part of the route on how to reach the target location, such a solution mentioned above may be implemented.

For example, the location of the second terminal is a location A of a restaurant, the target location is a location B of a scenic spot, and location N is a location of a bus station between locations A and B which is nearer to the location A. By the method as described above, the route between the locations A and N may be accurately navigated by using the route information between A and N drawn by the user at first and then the route between the locations N and B is navigated automatically by the server so as to help the second terminal arrive the target location B rapidly and exactly.

Figure 12:
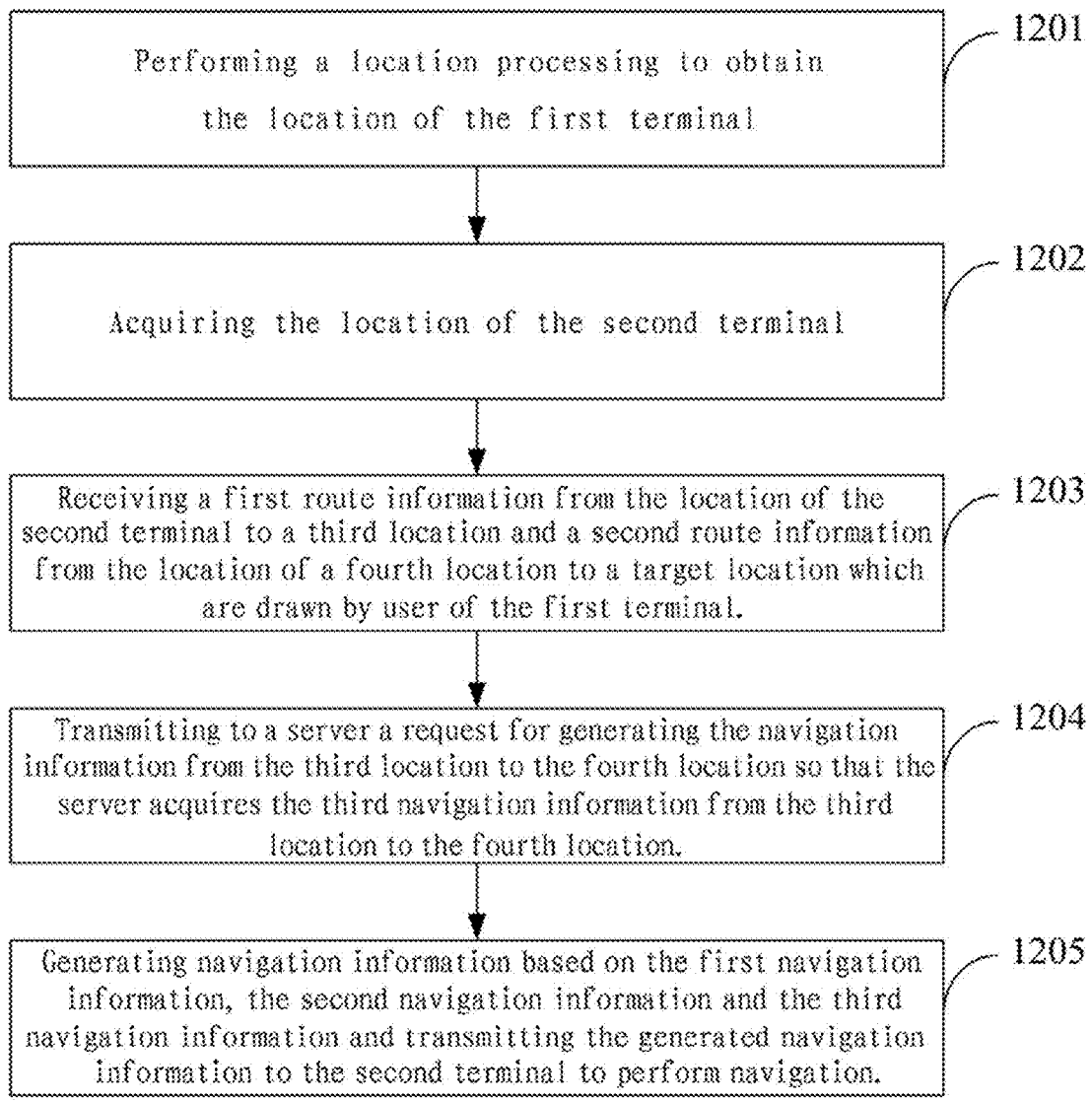
FIG. 12 is a flowchart illustrating a still navigation method according to Embodiment 5 of the present disclosure.

The third aspect, as shown in FIG. 12, provides a navigation method, which comprises performing a location processing to obtain the location of the first terminal (step 1201); acquiring the location of the second terminal (step 1202); receiving a first route information from the location of the second terminal to a third location and a second route information from the location of a fourth location to a target location which are drawn by user of the first terminal (step 1203); transmitting to a server a request for generating the navigation information from the third location to the fourth location so that the server acquires the third navigation information from the third location to the fourth location (step 1204); generating navigation information based on the first navigation information, the second navigation information and the third navigation information and transmitting the generated navigation information to the second terminal to perform navigation (step 1205), wherein the third location and the fourth location are any one location from the location of the second terminal to the target location and are different locations.

The method depicted in FIG. 12 may be applied in the circumstance in which the middle part of the route is navigated automatically by the server and the two end parts of the route are navigated by the user hand-drawing route information. By doing this, at first, the small beginning part of the route can be accurately navigated by using the route information hand-drawn by the user so as to help the user exactly find a location in the vicinity of the start point, which improves the accuracy of the navigation. And then, the middle large part of the route can be rapidly navigated automatically by the server so as to help the user rapidly reach a location in the vicinity of the target location. Finally, the end part of the route can be accurately navigated by using the route information drawn by the user so as to help the user exactly find a location in the vicinity of the target location. If the user of the second terminal is not favorite with the start part and the end part of the route, such a solution mentioned above may be implemented.

For example, the location of the second terminal is a location A of a residential district, the target location is a location B of a holiday center, a location X nearer to the location A is a location of an office building between locations A and B, and a location Y nearer to the location B is a location of a marketplace between locations A and B. By the method as described above, the route between the locations A and X may be accurately navigated by using the route information drawn by the user at first, then the route between the locations X and Y is navigated automatically by the server, and finally the route between the locations Y and B can be accurately navigated by using the route information drawn by the user, so as to help the second terminal arrive at the target location B rapidly and exactly.

The above method according to the present embodiment accomplished the location-based navigation service incorporating the automatic navigation and the hand-drawing navigation by performing the location processing to obtain the location of the location of the first terminal, acquiring the location of the second terminal, incorporating the navigation information acquired by the server and the route information hand-drawn by the user, and navigating the second the terminal based the navigation information from the location of the second terminal to the target location. The method incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded.

It shall be noted that, the above method combined the navigation information automatically acquired by the server and the route information drawn by the user. The automatic navigation by the server is rapid and the navigation accuracy by using the route information drawn by the user is high. Therefore, by combination of the automatic navigation and the hand-drawing navigation, the navigation speed and the accuracy are improved to obtain a good navigation effect. Compared with the automatic navigation of only using the navigation acquired by the server, the present method improves significantly the navigation accuracy, and compared with the navigation of only using the route information drawn by the user, the present method reduces significantly the user's workload.

Embodiment 6

Figure 13:
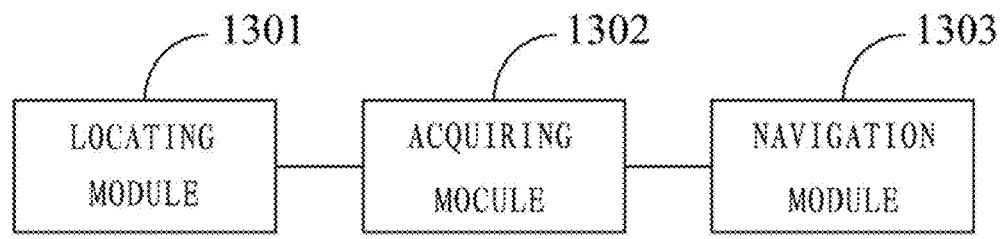
FIG. 13 is a diagram illustrating a structure of a first terminal for navigation according to Embodiment 6 of the present disclosure.

Referring to FIG. 13, a first terminal for navigation according to the present Embodiment, comprises: a locating module 1301, configured to perform a location processing to obtain a location of the first terminal; an acquiring module 1302, configured to acquire the location of the second terminal; navigation module 1303, configured to navigate the second terminal based on the navigation information from the location of the second terminal to the target location, wherein the target location is a predetermined location or the current location of the first terminal.

In the embodiment, the first terminal further comprises a sharing module, configured to transmit the location of the first terminal to the second terminal so as to share the locations with the second terminal.

In the embodiment, the navigation module 1303 includes a first navigation unit, configured to transmit to the server a request for generating the navigation information from the location of the second terminal to the target location to cause that the server acquires the navigation information from the location of the second terminal to the target location and transmits the generated navigation information to the second terminal to perform a navigation.

In the embodiment, the navigation module 1303 includes a second navigation unit, configured to receive the route information from the location of the second terminal to the target location which is drawn by the user of the first terminal and transmit the route information to the second terminal to perform navigation.

Additionally, the second navigation unit is configured to receive the route information from the location of the second terminal to the target location which is drawn by the user of the first terminal, transmit the route information to the server, cause that the server generates corresponding navigation information based the route information and transmit the generated navigation information to the second terminal to perform navigation.

In the embodiment, the navigation module 1303 includes a third navigation unit, configured to transmit the sever a request for generating navigation information from the location of the second terminal to a first location and cause that the server acquires a first navigation information from the location of the second terminal to the first location, receives route information from the first location to the target location which is drawn by the user of the first terminal, generates navigation information based on the first navigation information and the route information, and transmits the generated navigation information to the second terminal to perform navigation, wherein the first location is any one location from the location of the second terminal to the target location.

In the embodiment, the navigation module 1303 includes a fourth navigation unit, configured to receive the route information from the location of the second terminal to a second location which is drawn by the user of the first terminal and transmit to the server a request for generating navigation information from the second location to the target location to cause the server to acquire a second navigation information from the second location to the target location; generate navigation information based on the route information and the second navigation information and send the generated navigation information to the second terminal to perform navigation, wherein the second location is any one location from the location of the second terminal to the target location.

In the embodiment, the navigation module 1303 includes a fifth navigation unit, configured to receive a first route information from the location of the second terminal to a third location and a second route information from a fourth location to the target location which are drawn by the user of the first terminal, transmit to the server a request for generating navigation information from the third location to the fourth location to cause the server to acquire a third navigation information from the third location to the fourth location, and generate navigation information based on the first route information, the second route information and the third navigation information and send the generated navigation information to the second terminal to perform navigation, wherein the third location and the fourth location respectively are any one location from the location of the second terminal to the target location and are different from each other.

In the embodiment, the first terminal further includes a share-requesting module, configured to transmit a request for sharing locations between the second terminal and the first terminal before the locating module 1301 performs the location processing to obtain the location of the first terminal, wherein the request includes a number and a specified identification of the second terminal, the specified identification is used for acquiring a number of the first terminal, and the step of performing the location processing to obtain the location of the first terminal is executed after a confirmation that the second terminal accepts the request is received.

The first terminal according to the present embodiment may implements any one method according the previous embodiments and the detail procedures may be referred to the description above with respect to the method embodiments and will not be described in detail.

The first terminal according to the present embodiment accomplished the location-based navigation service by performing the location processing to obtain the location of the location of the first terminal and acquiring the location of the second terminal and using the navigation information from the location of the second terminal to the target location to navigate the second terminal, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

Embodiment 7

Figure 14:
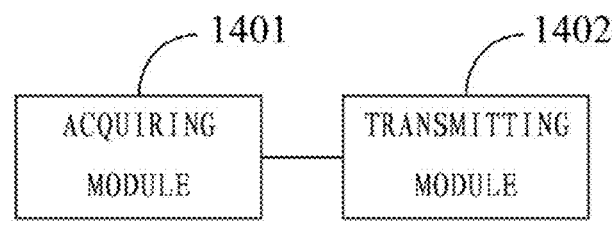
FIG. 14 is a diagram illustrating a structure of a server for user navigation according to Embodiment 7 of the present disclosure.

Referring to FIG. 14, a server for navigation according to the present Embodiment, comprises: an acquiring module 1401 configured to acquire navigation information from the location of a second terminal to a target location which is a predetermined location or the location of the first terminal, a transmitting module 1402 configured to transmit the navigation information acquired by the acquiring module 1401 to the second terminal to perform navigation.

In the embodiment, the acquiring module 1401 includes a first acquiring unit, configured to receive a request for generating navigation information which is transmitted by the first terminal based on the location of the first terminal and the target location and acquire the navigation information from the location of the second terminal to the target location.

In the embodiment, the acquiring module 1401 includes a second acquiring unit, configured to receive the route information from the location of the second terminal to the target location which is drawn by the user and transmitted from the first terminal and generate corresponding navigation information based on the route information.

Additionally, the transmitting module 1402 may transmit the navigation information to the first terminal at first, and then, after the user of the first terminal confirms the transmitted navigation information, transmit the confirmed navigation information to the second terminal to perform navigation.

In the embodiment, the acquiring module 1401 includes a third acquiring unit, configured to receive a request for generating the navigation information from the location of the second terminal to the first location which is transmitted from the first terminal, acquire the first navigation information from the location of the second terminal to the first location, receive the route information from the first location to the target location which is drawn by the user of the first terminal, and generate navigation information based on the first navigation information and the route information, wherein the first location is any one location between the location of the second terminal and the target location.

In the embodiment, the acquiring module 1401 includes a fourth acquiring unit, configured to receive a second route information from the location of the second terminal to a second location which is drawn by the user of the first terminal, receive a request for generating navigation information from the second location to the target location which is transmitted from the first terminal, acquire a second navigation information from the second location to the target location, and generate navigation information based on the route information and the second navigation information, wherein the second location is any one location from the location of the second terminal to the target location.

In the embodiment, the acquiring module 1401 includes a fifth acquiring unit, configured to receive a first route information from the location of the second terminal to a third location and a second route information from the fourth location to the target location which are drawn by the user of the first terminal, receive a request for generating navigation information from the third location to the fourth location which is transmitted from the first terminal, acquire a third navigation information from the third location to the fourth location, and generate navigation information based on the first route information, the second route information and the third navigation information, wherein the third location and the fourth location respectively are any one location from the location of the second terminal to the target location and different from each other.

In the embodiment, the server further comprises a location-sharing triggering module, configured to receive a location-sharing request for sharing locations with the second terminal transmitted from the first terminal, in which a number and a specified identification of the second terminal are included, acquire a number of the first terminal based on the specified identification, and transmit the number of the first terminal and the location-sharing request together to the second terminal.

The server according to the present embodiment may implements any one method according to the previous embodiments and the detail procedures may be referred to the description above with respect to the method embodiments and will not be described in detail.

The server according to the present embodiment accomplished the location-based navigation service by acquiring the navigation information from the location of the second terminal to the target location and transmitting the navigation information to the second terminal to perform navigation, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

Embodiment 8

Figure 15:
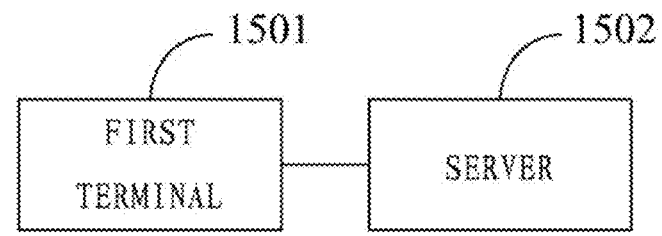
FIG. 15 is a diagram illustrating a structure of a navigation system according to Embodiment 8 of the present disclosure.

Referring to FIG. 15, a navigation system according to the present embodiment comprises a first terminal 1501 and a server 1502.

The first terminal 1501 has the same functions as those described with respect to Embodiment 6 and the server 1502 has the same functions as those described with respect to Embodiment 7. Therefore, their detail description will be omitted herein.

The system according to the present embodiment may implement any one method as described above which can be referred to for detail. The description of their detail procedure may be referred to. Therefore, for simply, their detail description will be omitted herein.

The system according to the present embodiment accomplished the location-based navigation service by performing the location processing to obtain the location of the location of the first terminal, acquiring the location of the second terminal, and using the navigation information from the location of the second terminal to the target location to navigate the second terminal, and incorporated the location service and the navigation function to solve the problem that the prior art cannot provide the navigation service but only provide the location-sharing. Therefore, the technique of the disclosure meets with sufficiently the requirements of users by enhancing the location service function and improving convenience for use and applicability. Additionally, the method of the disclosure achieves a cross-platform sharing which can cause any type of terminals to use the real-time location-sharing so that the range of the users is expanded. Further, since the server is instructed to transmit the number of the requester to the receiver according to the specified identification, a mutual location-sharing can be accomplished only through a single invitation, which eliminates some complicate steps such as mutual requests between two parties so as to simplify the operation of location-sharing, reduce the difficulty in use and make the location-based service easily, quickly and conveniently.

The person skilled in the art can understand that the entire processes or part thereof described above may be implemented by hardware or by a computer program instructing relevant hardware. Said program may be stored in a computer-readable storage medium which may include a read-only memory (ROM), a magnetic disk, or a CD (compact disc) etc.

The descriptions of the various embodiments of the present invention have been presented only for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A navigation method, comprising:
   sharing locations between a first terminal and a second terminal by performing a location processing and a sharing processing so as to obtain locations of the first terminal and the second terminal;
   transmitting a request from the first terminal to a server to request that the server sends navigation information from the location of the second terminal to a target location to the second terminal so as to navigate the second terminal, the target location being a predetermined location or a current location of the first terminal,
   wherein the transmitting a request from the first terminal to a server to request that the server sends navigation information from the location of the second terminal to a target location to the second terminal so as to navigate the second terminal comprises
   transmitting, by the first terminal, to the server the request together with route information from the location of the second terminal to the target location which route information is drawn by the user of the first terminal so that the server generates corresponding navigation information based on the route information and sends the generated navigation information to the second terminal to perform a navigation processing,
   wherein the transmitting a request from the first terminal to a server to request that the server sends navigation information from the location of the second terminal to a target location to the second terminal so as to navigate the second terminal comprises
   transmitting to the server a first route information from the location of the second terminal to a third location and a second route information from a fourth location to the target location, wherein the first route information and the second route information are drawn by the user of the first terminal;
   instructing the server to generate a third navigation information from the third location to the fourth location; and
   causing the server to generate navigation information based on the first route information, the second route information and the third navigation information and send the generated navigation information to the second terminal to perform a navigation processing, the third location and the fourth location being any locations from the location of the second terminal to the target location and different from each other.

2. The navigation method according to claim 1, wherein the sharing locations between a first terminal and a second terminal by performing a location and sharing processing so as to obtain locations of the first terminal and the second terminal comprises
   transmitting a location-sharing request from the first terminal to the second terminal, the location-sharing request including a number and a specified identification of the second terminal and the specified identification being used to acquire the number of the first terminal;
   transmitting an acknowledgement of accepting the location-sharing request from the second terminal to the first terminal in response to the location-sharing request; and performing the location processing by the first terminal and the second terminal respectively to obtain respective locations of the first terminal and the second terminal and sharing their locations between the first terminal and the second terminal.

3. The navigation method according to claim 1, wherein the transmitting a request from the first terminal to a server to request that the server sends navigation information from the location of the second terminal to a target location to the second terminal so as to navigate the second terminal comprises transmitting, by the first terminal, to the server a request for generating navigation information from the location of the second terminal to the target location so that the server generates the navigation information from the location of the second terminal to the target location and sends the navigation information to the second terminal to perform a navigation processing.

4. The navigation method according to claim 1, wherein the transmitting a request from the first terminal to a server to request that the server sends navigation information from the location of the second terminal to a target location to the second terminal so as to navigate the second terminal comprises instructing the server to generate first navigation information from the location of the second terminal to a first location;

transmitting to the server route information from the first location to the target location, which route information is drawn by the user of the first terminal; and causing that the server generates navigation information based on the first navigation information and the route information and sends the generated navigation information to the second terminal to perform a navigation processing, the first location being any one location from the location of the second terminal to the target location.

5. The navigation method according to claim 1, wherein the transmitting a request from the first terminal to a server to request that the server sends navigation information from the location of the second terminal to a target location to the second terminal so as to navigate the second terminal comprises transmitting to the server route information from the location of the second terminal to a second location which route information is drawn by the user of the first terminal;

instructing the server to generate a second navigation information from a second location to the location of the second terminal; and causing that the server generates navigation information based on the second navigation information and the route information and sends the generated navigation information to the second terminal to perform a navigation processing, the second location being any one location from the location of the second terminal to the target location.

6. A first terminal for navigation, comprising:
a location-sharing request module configured to transmit to the second terminal a location-sharing request for sharing locations with the second terminal;
a locating module configured to perform a location processing to obtain a location of the first terminal and share its location with the second terminal;
a navigation module configured to transmit a request to a server to request that the server sends navigation information from the location of the second terminal to a target location to the second terminal so as to navigate the second terminal, the target location being a predetermined location or a current location of the first terminal, wherein the navigation module comprises a second navigation unit configured to transmit to the server the request together with route information from the location of the second terminal to the target location which route information is drawn by the user of the first terminal so that the server generates corresponding navigation information based on the route information and sends the generated navigation information to the second terminal to perform a navigation processing, wherein the navigation module is further configured to transmit to the server a first route information from the location of the second terminal to a third location and a second route information from a fourth location to the target location, wherein the first route information and the second route information are drawn by the user of the first terminal;

to instruct the server to generate a third navigation information from the third location to the fourth location; and to cause the server to generate navigation information based on the first route information, the second route information and the third navigation information and send the generated navigation information to the second terminal to perform a navigation processing, the third location and the fourth location being any locations from the location of the second terminal to the target location and different from each other.

7. The first terminal according to claim 6, wherein,
the location-sharing request includes a number and a specified identification of the second terminal and the specified identification is used to acquire the number of the first terminal; and after receiving an acknowledgement of accepting the location-sharing request transmitted from the second terminal in response to the location-sharing request, the locating modules of the first terminal and the second terminal perform the location processing by respectively to obtain respective locations and share the obtained locations therebetween.

8. The first terminal according to claim 6, wherein the navigation module comprises a first navigation unit configured to transmit to the server a request for generating navigation information from the location of the second terminal to the target location so that the server generates the navigation information from the location of the second terminal to the target location and sends the generated navigation information to the second terminal to perform a navigation processing.

9. The first terminal according to claim 6, wherein the navigation module comprises a third navigation unit configured to instruct the server to generate a first navigation information from the location of the second terminal to a first location, to transmit to the server route information from the first location to the target location which route information is drawn by the user of the first terminal, and to cause that the server generates navigation information based on the first navigation information and the route information and sends the generated navigation information to the second terminal to perform a navigation processing, the first location being any one location from the location of the second terminal to the target location.

10. The first terminal according to claim 6, wherein the navigation module comprises a fourth navigation unit configured to transmit to the server route information from the location of the second terminal to a second location which route information is drawn by the user of the first terminal, to instruct the server to generate a second navigation information from a second location to the location of the second terminal; and to cause that the server generates navigation information based on the second navigation information and the route information and sends the generated navigation information to the second terminal to perform a navigation processing, the second location being any one location from the location of the second terminal to the target location.

11. A server for navigation, comprising:
a location-sharing triggering module configured to receive from the first terminal a location-sharing request for sharing locations with the second terminal, the location-sharing request including a number and a specified identification of the second terminal, the location-sharing triggering module acquiring a number of the first terminal based on the specified identification and transmitting the number of the first terminal and the location-sharing request together to the second terminal so as to trigger the location sharing between the first terminal and the second terminal;
an acquiring module configured to, based on a navigation request from the first terminal, acquire navigation information from the location of a second terminal to a target location, the target location being a predetermined location or the location of a first terminal; and
a transmitting module configured to transmit the navigation information acquired by the acquiring module to the second terminal to perform a navigation processing,
wherein the acquiring module comprises a second acquiring unit configured to receive from the first terminal route information from the location of the second terminal to the target location which route information is drawn by the user and generate navigation information based on the route information,
wherein the acquiring module is further configured to receive from the first terminal a first route information from the location of the second terminal to a third location and a second route information from the fourth location to the target location, wherein the first route information and the second route information are drawn by the user of the first terminal,
to receive from the first terminal a request for generating a third navigation information from the third location to the fourth location so as to generate the third navigation information, and
to generate navigation information based on the first route information, the second route information and the third navigation information, the third location and the fourth location respectively being any one location from the location of the second terminal to the target location and different from each other.

12. The server according to claim 11, wherein the acquiring module comprises a first acquiring unit configured to receive from the first terminal a request for generating navigation information based on the location of the first terminal and the target location so as to generate the navigation information from the location of the second terminal to the target location based on the request.

13. The server according to claim 11, wherein the acquiring module comprises a third acquiring unit configured to receive from the first terminal a request for generating a first navigation information from the location of the second terminal to a first location so as to generate the first navigation information, to receive from the first terminal route information from the first location to the target location which route information is drawn by the user of the first terminal, and to generate navigation information based on the first navigation information and the route information, the first location being any one location between the location of the second terminal and the target location.

14. The server according to claim 11, wherein the acquiring module comprises a fourth acquiring unit configured to receive from the first terminal route information from the location of the second terminal to a second location which route information is drawn by the user of the first terminal, to receive from the first terminal a request for generating a second navigation information from the second location to the target location so as to generate the second navigation information, and to generate navigation information based on the route information and the second navigation information, the second location being any one location from the location of the second terminal to the target location.

\* \* \* \* \*